(12) United States Patent
Jung et al.

(10) Patent No.: US 10,494,275 B2
(45) Date of Patent: Dec. 3, 2019

(54) ELECTROLYSIS MODULE

(71) Applicant: Techwin Co., Ltd., Cheongju, Chungcheongbuk-do (KR)

(72) Inventors: Boong Ik Jung, Chungcheongbuk-do (KR); Jung Sik Kim, Chungcheongbuk-do (KR); Hyun Su Shin, Daejeon (KR); Min Yong Kim, Chungcheongbuk-do (KR)

(73) Assignee: Techwin Co., Ltd., Cheongju, Chungcheongbuk-do (KR)

( * ) Notice: Subject to any disclaimer, the term of this patent is extended or adjusted under 35 U.S.C. 154(b) by 0 days.

(21) Appl. No.: 15/624,158

(22) Filed: Jun. 15, 2017

(65) Prior Publication Data

US 2017/0283284 A1 Oct. 5, 2017

Related U.S. Application Data

(63) Continuation of application No. PCT/KR2015/011465, filed on Oct. 28, 2015.

(30) Foreign Application Priority Data

Dec. 23, 2014 (KR) .................. 10-2014-0187429

(51) Int. Cl.
*C25B 11/02* (2006.01)
*C25B 9/06* (2006.01)
*C02F 1/461* (2006.01)

(52) U.S. Cl.
CPC ............ *C02F 1/46109* (2013.01); *C02F 2001/46128* (2013.01); *C02F 2001/46171* (2013.01)

(58) Field of Classification Search
CPC ... C02F 2001/46128; C02F 2201/4611; C25B 11/02; C25B 9/063; C25B 9/18; C25B 9/06; C25B 9/203

USPC ........................................................ 204/268
See application file for complete search history.

(56) References Cited

U.S. PATENT DOCUMENTS

| 2007/0196730 A1* | 8/2007 | Kozuki ............... H01M 2/0225 429/161 |
| 2011/0147203 A1 | 6/2011 | Hermann et al. |
| 2014/0261252 A1* | 9/2014 | Kerstiens .......... F02M 21/0206 123/3 |

FOREIGN PATENT DOCUMENTS

| EP | 2631334 A1 | 8/2013 |
| GB | 2513368 A | 10/2014 |
| JP | 59-154397 U1 | 10/1984 |
| JP | 08-309357 A | 11/1996 |
| JP | 2014523490 A | 9/2014 |
| JP | 2014530755 A | 11/2014 |

(Continued)

*Primary Examiner* — Zulmariam Mendez
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed is an electrolysis module including: an electrolysis unit module including a plurality of pipe-type electrolysis cells connected in series with each other; a molding case surrounding the periphery of the electrolysis unit module to protect the electrolysis module; a cell guide member installed in the molding case to support the electrolysis unit module; a power cable having a first end connected to the electrolysis unit module and a second end extending to an outside through the molding case; and a resin layer formed by filling the inside of the molding case to cover the outer surface of the electrolysis unit module disposed in the molding case.

17 Claims, 32 Drawing Sheets

(56) References Cited

FOREIGN PATENT DOCUMENTS

| | | |
|---|---|---|
| KR | 10-2010-0011851 A | 2/2010 |
| KR | 10-2013-0110429 A | 10/2013 |
| KR | 10-1412721 B1 | 6/2014 |
| KR | 10-2014-0113958 A | 9/2014 |

\* cited by examiner

Related Art

Related Art

Related Art

Related Art

Related Art

Related Art

Related Art

Related Art

"A"

Related Art

"B"

Related Art

Related Art

ELECTROLYSIS MODULE

CROSS-REFERENCE TO RELATED APPLICATIONS

This application is a continuation application of International Application No. PCT/KR2015/011465 filed on Oct. 28, 2015, which claims priority to Korean Application No. 10-2014-0187429 filed on Dec. 23, 2014, which applications are incorporated herein by reference.

TECHNICAL FIELD

The present invention relates to an electrolysis module and, more particularly, to an electrolysis module constructed by connecting a plurality of unit modules in parallel with each other, each unit module including a plurality of pipe-type electrolysis cells connected in series with each other, each pipe-type electrolysis cell having a reduced size while providing advantages of a tube type electrolysis cell, whereby the pipe-type electrolysis cell can overcome a constraint of limited installation space and reduce manufacturing cost.

BACKGROUND ART

As a typical example of an electrolytic cell for electrolyzing sea water, fresh water, or the like, there is a pipe-type electrolysis cell.

The pipe-type electrolysis cell has a pipe-type electrode typically consisting of an outer pipe and an inner pipe. The inner pipe is a combined bipolar tube electrode in which one portion serves as an anode and the other portion serves as a cathode. The outer pipe includes an anode portion, a cathode portion, and an insulating spacer disposed at a center portion thereof, in which the anode portion and the cathode portion are disposed to be opposite to the anode and the cathode of the inner pipe. Alternatively, both of the inner pipe and the outer pipe may be monopolar electrodes having one polarity.

In the pipe-type electrolytic cell, when DC power is applied between terminals of an anode and a cathode to cause electrolysis while sea water flows along the surfaces of the inner pipe and the outer pipe, sodium hypochlorite is produced.

Principal chemical equations of electrolysis to produce sodium hypochlorite are as follows:

Anodic reaction: 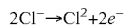

Cathodic reaction: 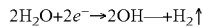

Bulk reaction: 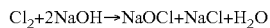

Chlorine ($Cl_2$) is produced at the anode side through oxidation of chlorine ions, and hydrogen gas ($H_2$) and hydroxyl ions (OH—) are produced at the cathode side through water splitting. Hydroxyl ions (OH—) produced at the cathode side react with sodium ions (Na+) in a bulk phase, to produce sodium hydroxide (NaOH), and the sodium hydroxide (NaOH) reacts with chlorine ($Cl_2$) produced at the anode, in a bulk phase, to produce sodium hypochlorite (NaOCl). Sodium hypochlorite (NaOCl) produced in this way is used to lower biological activity, or used in various applications for sterilization (disinfection) and cleaning.

Hardness materials such as Ca and Mg contained in sea water form scale on a cathode electrode through chemical reactions described below, during electrolysis, and the accumulated scale lowers electrolysis efficiency, resulting in an increase in cell voltage, impedes the flow of a fluid, and causes physical damage attributable to short-circuiting between electrodes in extreme cases.

Scale formation reaction: 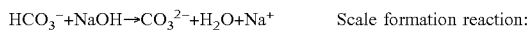

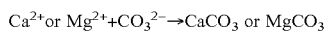

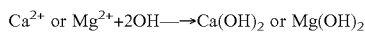

A conventional technology of preventing accumulation of scale is disclosed in Korean Patent Application Publication No. 10-2006-0098445 (Electronic Water Treatment System And Method For Controlling The Same). According to this technology, an anode bar serving as an anode is installed inside a pipeline through which a fluid flows, a housing surrounding the anode bar serves as a cathode, and an electric current flows through the anode bar to form electromagnetic fields in a fluid passage, thereby preventing generation of scale. That is, when a fluid flows along the fluid passage in which electromagnetic fields are formed, since free electrons are sufficiently generated due to the electromagnetic fields, inorganic substances contained in the fluid become structurally stable, thereby preventing scale formation.

The conventional technology requires generation of uniform density of electromagnetic fields to suppress the generation of scale. However, in the case in which the flow rate of fluid, flowing along the fluid passage, is not constant but fluctuates, it is difficult to maintain uniform density of electromagnetic fields. For this reason, it is difficult to effectively impede scale formation. That is, the conventional art, which prevents scale formation through an electrical method, requires an advanced technology to precisely control the intensity of current in accordance with the flow rate of fluid. Therefore, it is not easy to substantially prevent scale formation, and thus it is necessary to mechanically remove generated scale.

To solve the problem of this technology, Korean Patent Application No. 10-2012-0032399 (titled "Pipe-type Electrolysis Cell) is disclosed. The "Pipe-type Electrolysis Cell" provides an electrolytic cell in which corners of electrodes in a fluid passing zone are eliminated to prevent scale formation on the surface of a cathode during operation of the electrolytic cell. The construction of the pipe-type electrolysis cell is shown in FIGS. 1 to 11.

With reference to FIGS. 1 to 11, according to a conventional art, a pipe-type electrolysis cell 10 includes an insulating spacer 11 disposed at a middle portion thereof, an anode outer pipe 12 disposed on one side of the insulating spacer 11, and a cathode outer pipe 13 disposed on the other side of the insulating spacer 11. A cathode inner pipe (not shown) is installed inside the anode outer pipe 12, and an anode inner pipe 13' is installed inside the cathode outer pipe 13. An insulating bushing 14, a spiral block 15, a fixing bushing 16, and an inlet/outlet connection nipple 17 are assembled with an end of the electrolysis cell 10 by a coupling member 18. Due to the use of the spiral block 15, when a fluid flows in and out of the electrolysis cell 10 through a spiral hole 15a formed in the spiral block 15, since a fluid passage has a spiral form, the fluid can flow at a constant uniform flow rate. This prevents hydrogen gas $H_2$ and oxygen gas $O_2$ generated during an electrolytic reaction from being locally concentrated in a specific portion, thereby removing an intervening factor of surface reaction attributable to the gases and enabling uniform reaction.

Therefore, it is possible to obtain effects of an improvement in efficiency of electrolytic reaction and an increase in life span of the electrolysis cell.

In addition, a plurality of electrolysis cells 10, each cell being the pipe-type electrolysis cell 10 having the structure described above, is connected in series with each other to form a unit module 20 as illustrated in FIG. 1. Therefore, it is possible to easily provide a module having desired capacity. Furthermore, a plurality of unit modules 20 may be connected in parallel with each other to increase the electrolysis capacity, as illustrated in FIG. 6

On the other hand, in order to manufacture the unit module 20, one electrolysis cell 10 and another electrolysis cell 10 are connected via a U-shaped elbow connection member or an arbitrary connection member 21 manufactured through a molding process so that a fluid can flow from one cell to another. Then, the electrolysis cells 10 are fixed to frames 22 using U-shaped saddles 23 or bolts. In addition, upper electrolysis cells 10 and lower electrolysis cells 10 are connected via bus bars 24. In this way, it is possible to manufacture the unit module 20 by connecting multiple electrolysis cells 10. Furthermore, it is possible to assemble and install a large-capacity electrolysis module 30 on site by connecting the unit modules 20 in parallel with each other as shown in FIG. 6.

The electrolysis module consisting of the pipe-type electrolysis cells has a higher withstand voltage and a simpler structure than conventional cube-shaped electrolysis modules using a flat plate electrode. Furthermore, since this electrolysis module has an improved velocity profile, it is possible to minimize scale accumulation and facilitate hydrogen emissions.

However, in the case of the conventional pipe-type electrolysis cell, since only one surface of the electrode is involved in an electrolytic reaction, a large amount of material is likely to be wasted. In addition, since the pipe-type electrolysis cell requires a large installation space, it is difficult to use the pipe-type electrolysis cell in small places. In addition, since the number of parts of the pipe-type electrolysis cell is large and assembling of the parts is complicated, the manufacturing cost is increased.

In addition, in the case of the conventional pipe-type electrolysis cell, current distribution is non-uniform over the electrode. Therefore, when the conventional pipe-type electrolysis cells are arranged in multiple stages, it is difficult to obtain uniform reaction, the life span of the electrode is shortened, and excessive heat is generated.

SUMMARY

Accordingly, the present invention has been made keeping in mind the above problems occurring in the related art, and an object of the present invention is to provide an electrolysis module that can reduce the manufacturing cost by reducing the number of parts thereof and simplifying a manufacturing method, and can overcome a space constraint problem by having a size that is about a half of the size of a conventional unit module having the same capacity, while providing advantages of conventional technologies that are proven to be safe.

Another object of the present invention is to improve uniformity and efficiency of reaction by enabling uniform current distribution throughout pipe-type electrolysis cells arranged in multiple stages.

That is, the present invention is devised in consideration of the above problems, and is intended to provide an improved pipe-type electrolysis module having a reduced size while maintaining an electrolysis performance, thereby saving installation space and reducing manufacturing cost.

In order to accomplish the above objects, according to one aspect, there is provided an electrolysis module including: an electrolysis unit module including a plurality of pipe-type electrolysis cells connected in series with each other; a molding case surrounding and protecting the electrolysis unit module; a cell guide member installed inside the molding case and supporting the electrolysis unit module; a power cable having a first end connected to the electrolysis unit module and a second end extending to an outside through the molding case; and a resin layer filled in the molding case to cover an outer surface of the electrolysis unit module disposed in the molding case.

In order to accomplish the above objects, according to another aspect, there is provided an electrolysis module including: an electrolysis unit module including a plurality of pipe-type electrolysis cells connected in series with each other; a power cable having a first end connected to the electrolysis unit module; a cell guide member extending across the electrolysis module to maintain a series-connected state of the electrolysis unit module; and a resin layer formed by introducing a resin into a molding case to cover an outer surface of the electrolysis unit module disposed in the molding case, in a state in which the electrolysis unit module is assembled with the power cable and the cell guide member and in which the molding case is disposed to surround a periphery surface of the electrolysis unit module, and then by removing the molding case after the resin is cured.

Preferably, the pipe-type electrolysis cell may include: a pair of terminal electrodes including a pipe-type outer electrode and a pipe-type inner electrode that are connected to each other at first ends thereof and separated from each other at second ends thereof; and a pipe-type bipolar electrode installed between the terminal electrodes and electrically insulated from the terminal electrodes.

The pipe-type electrolysis cell may further include: an insulation unit supporting and connecting the separated ends of the terminal electrodes to each other; a spiral block combined with the connected ends of the terminal electrodes and provided with a spiral guide hole through which a fluid passes.

The terminal electrode may include a connection plate connecting and supporting the ends of the inner electrode and the outer electrode, the connection plate being provided with a fluid passing hole communicating with a channel formed between the inner electrode and the outer electrode and guiding a fluid to the channel.

The electrolysis module may further include a terminal insulating spacer installed at each end of the bipolar electrode and spacing and electrically insulating the bipolar electrode from the connection plate, the inner electrode, and the outer electrode.

At least any one of an outer surface of the outer electrode and an inner surface of the inner electrode, which are surfaces that are not involved in an electrolytic reaction, is plated with a metal having a high electrical conductivity.

The connection plate having the fluid passing hole is connected to the outer electrode through welding.

Fluid passing holes formed in the connection plate may be through holes aligned with spiral guide holes formed in the spiral block.

The unit modules may be connected in parallel with each other to increase a capacity.

According to the present invention, the inside surface of the inner electrode is plated with a metal having a high electrical conductivity to improve the flow of an electrical current. Therefore, the electrolysis module has improved electrolysis efficiency. In addition, since the electrolysis module is molded with a resin, safety of the electrolysis module can be guaranteed. That is, it is possible to prevent a risk of explosion attributable to a leakage of water and hydrogen gas and to prevent workers or operators from being electrically shocked.

In addition, since it is possible to reduce the number of parts to be assembled compared with conventional technologies, an assembling process is simplified. Furthermore, since the number of parts is reduced, the manufacturing cost is also reduced. Still further, since the electrolysis module requires a reduced installation space, it is possible to overcome a problem of space constraint.

In addition, the coupling of the assembled parts is not loosened by external vibrations. Since the molding treatment is performed with a transparent material, the state of the electrolysis module can be easily inspected or checked, maintenance of the electrolysis module can be conveniently performed, and a maintenance cost is reduced. In addition, the pipe-type electrolysis cell used in the electrolysis module of the present invention has a structure in which both the inside surface and the outside surface of the bipolar electrode can be used for electrolysis. Therefore, electrolysis efficiency is doubled compared with convention electrolysis cells having the same size. For this reason, it is possible to reduce the size and the manufacturing cost of the electrolysis module, which obviates a problem of space constraint when the electrolysis module is installed in a ship.

In addition, when a multi-stage electrolytic cell is constructed, even the surfaces of the electrodes that do not participate in an electrolytic reaction are plated with a metal having a high electrical conductivity. Therefore, current distribution in the electrode is uniformized, and thus uniformity and efficiency of electrolysis can be improved.

DETAILED DESCRIPTION

Figure 1:
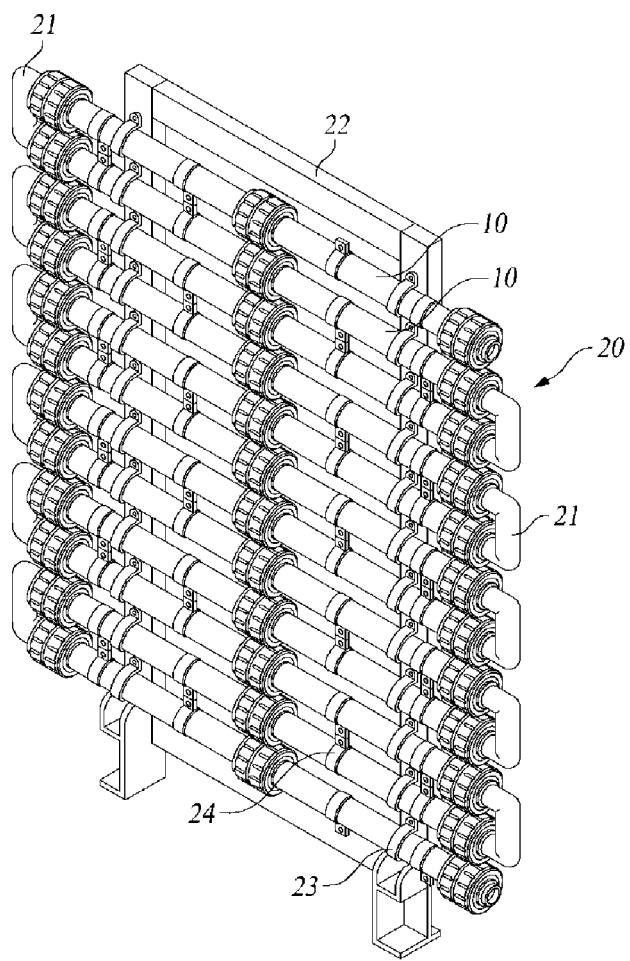
FIG. 1 is a perspective view of a conventional electrolysis unit module.
Figure 2:
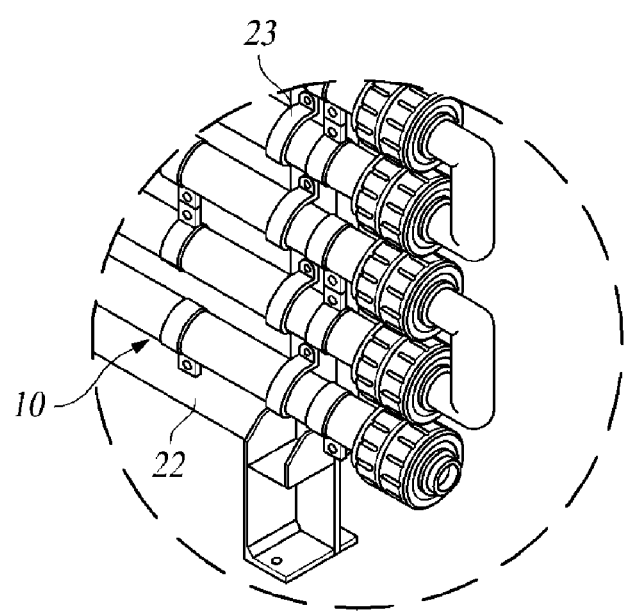
FIG. 2 is a partial expanded view of a main portion of the structure of FIG. 1.
Figure 3:
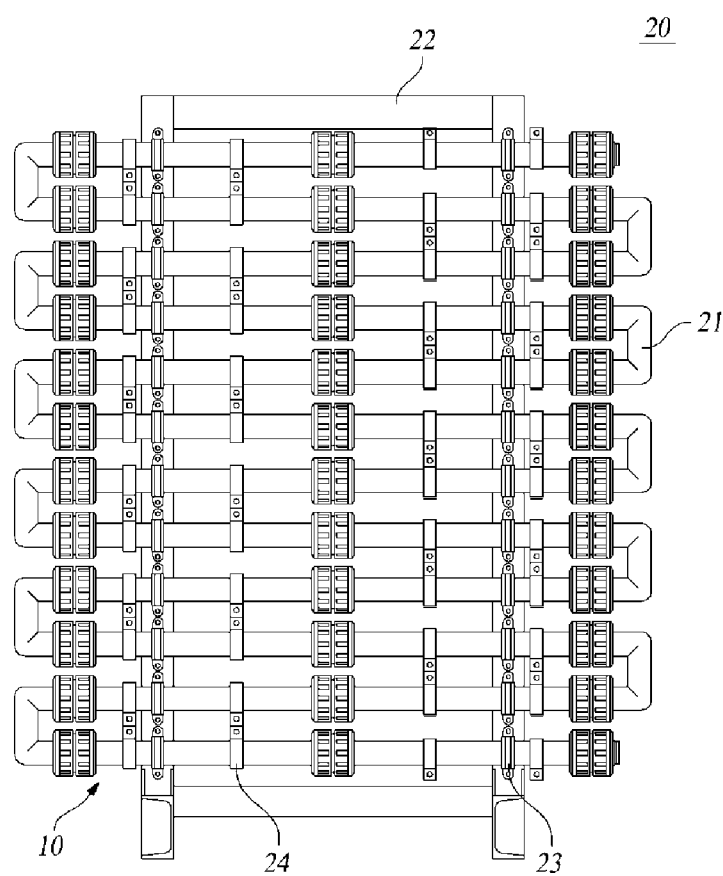
FIG. 3 is a front view of a electrolysis unit module of FIG. 1.
Figure 4:
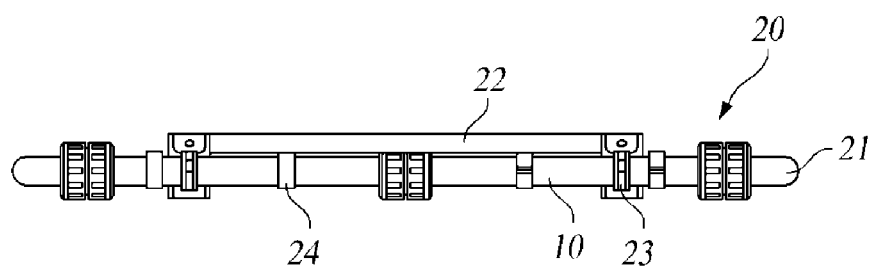
FIG. 4 is a plan view of the electrolysis unit module of FIG. 1.
Figure 5:
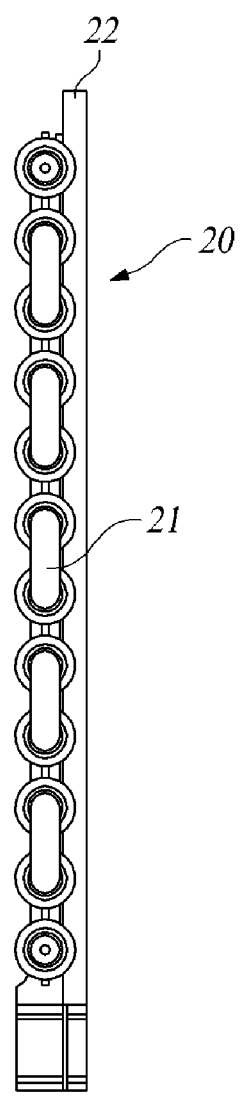
FIG. 5 is a side view of the electrolysis unit module of FIG. 1.
Figure 6:
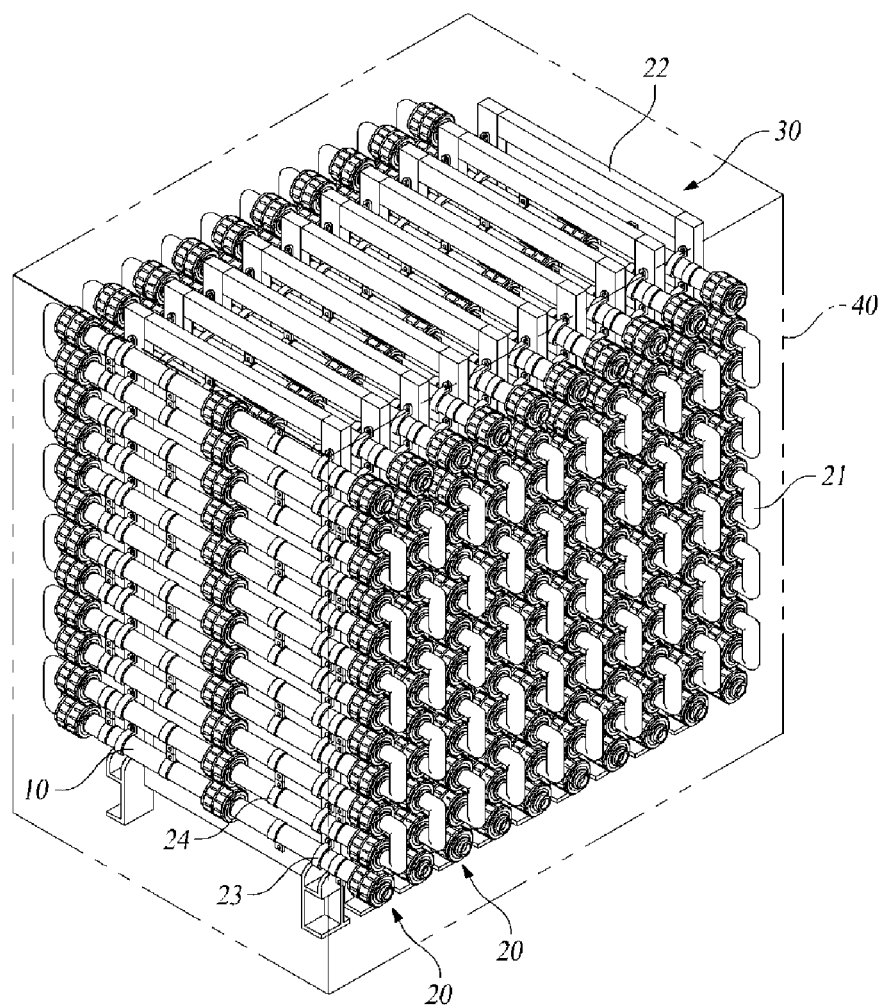
FIG. 6 is a perspective view of a conventional large-capacity electrolysis module.
Figure 7:
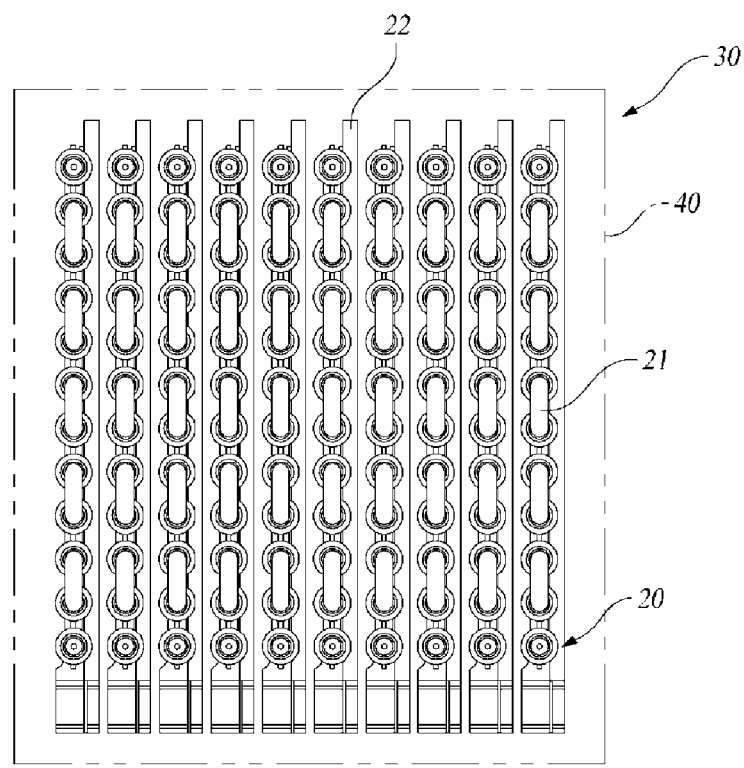
FIG. 7 is a side view of the large-capacity electrolysis module of FIG. 6.
Figure 8:
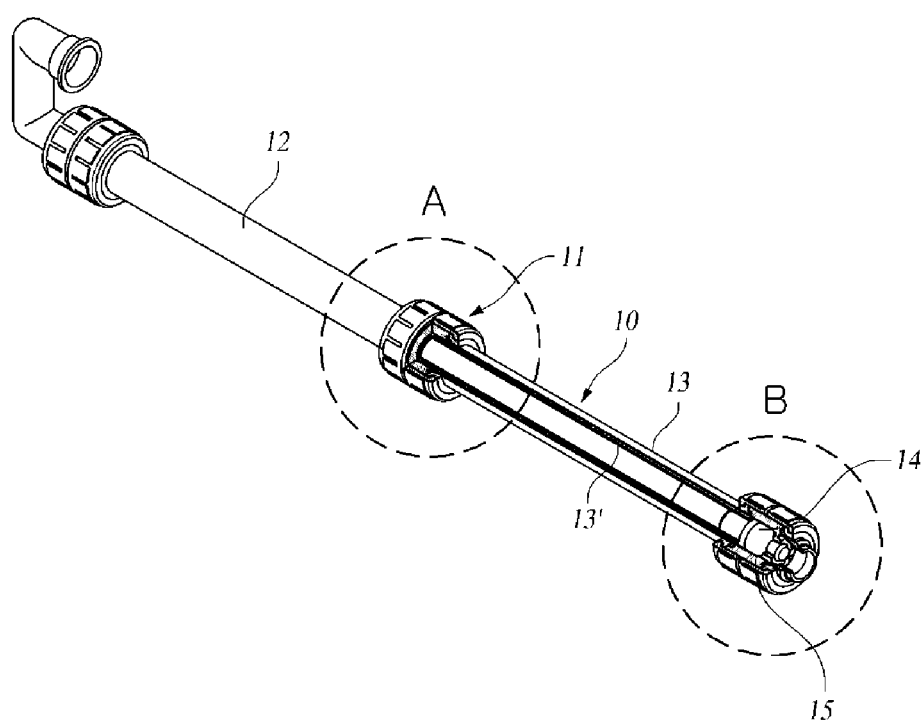
FIG. 8 is a perspective view of a conventional pipe-type electrolysis cell.
Figure 9:
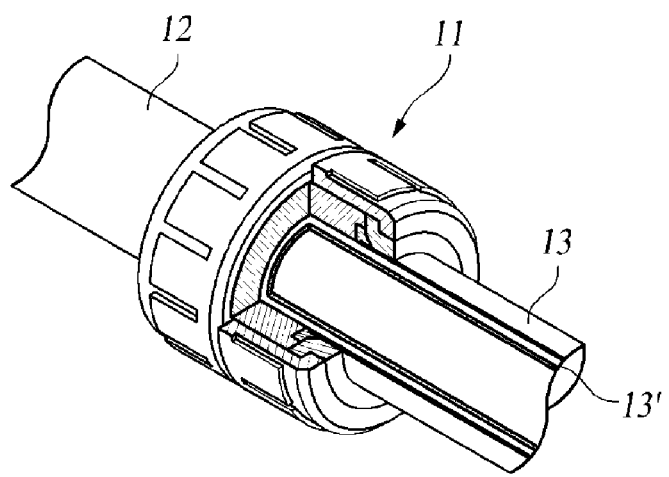
FIG. 9 is an expanded view of a portion A of FIG. 9.
Figure 10:
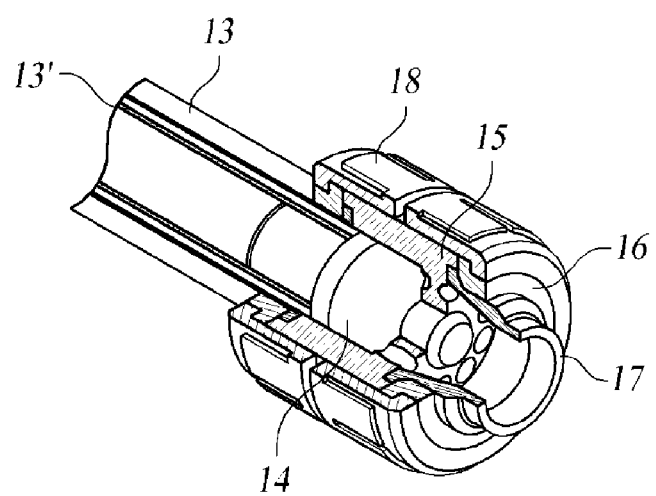
FIG. 10 is an expanded view of a portion B of FIG. 9.
Figure 11:
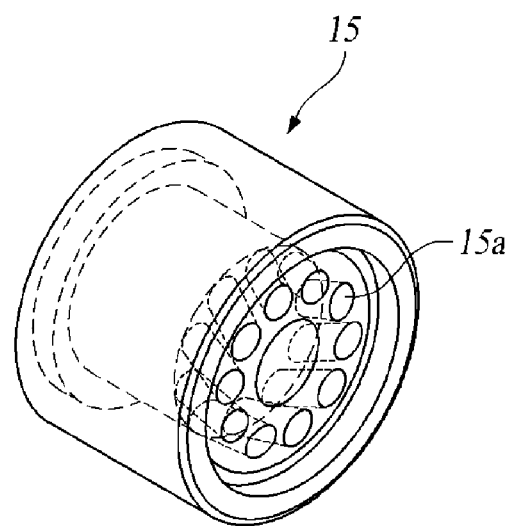
FIG. 11 is a perspective view illustrating only a spiral block shown in FIG. 10.

Hereinafter, a pipe-type electrolysis cell according to one embodiment of the invention and an electrolysis module including the pipe-type electrolysis cell will be described with reference to the accompanying drawings.

With reference to FIGS. 12 to 21, according to one embodiment, an electrolysis module 50 includes a electrolysis unit module 100, a molding case 200, a cell guide member 300, a power cable 400, and a resin layer 500.

With reference to FIGS. 19 to 27, the electrolysis unit module 100 includes a pipe-type electrolysis cell 110, a connection pipe 120, and an inlet/outlet connection nipple 130.

With reference to FIGS. 19 to 27, the pipe-type electrolysis cell 110 includes a pair of terminal electrodes, a bipolar electrode, an insulation unit, and a spiral block 118.

Herein, the pair of terminal electrodes includes inner electrodes 115a and 115b, outer electrodes 114a and 114b, and connection plates 116 by which first ends of the inner electrodes 115a and 115b are electrically connected to first ends of the outer electrodes 114a and 114b.

The bipolar electrode includes a pipe-type middle electrode 111 installed between the inner electrodes 115a and 115b and the outer electrodes 114a and 114b.

Figure 23A:
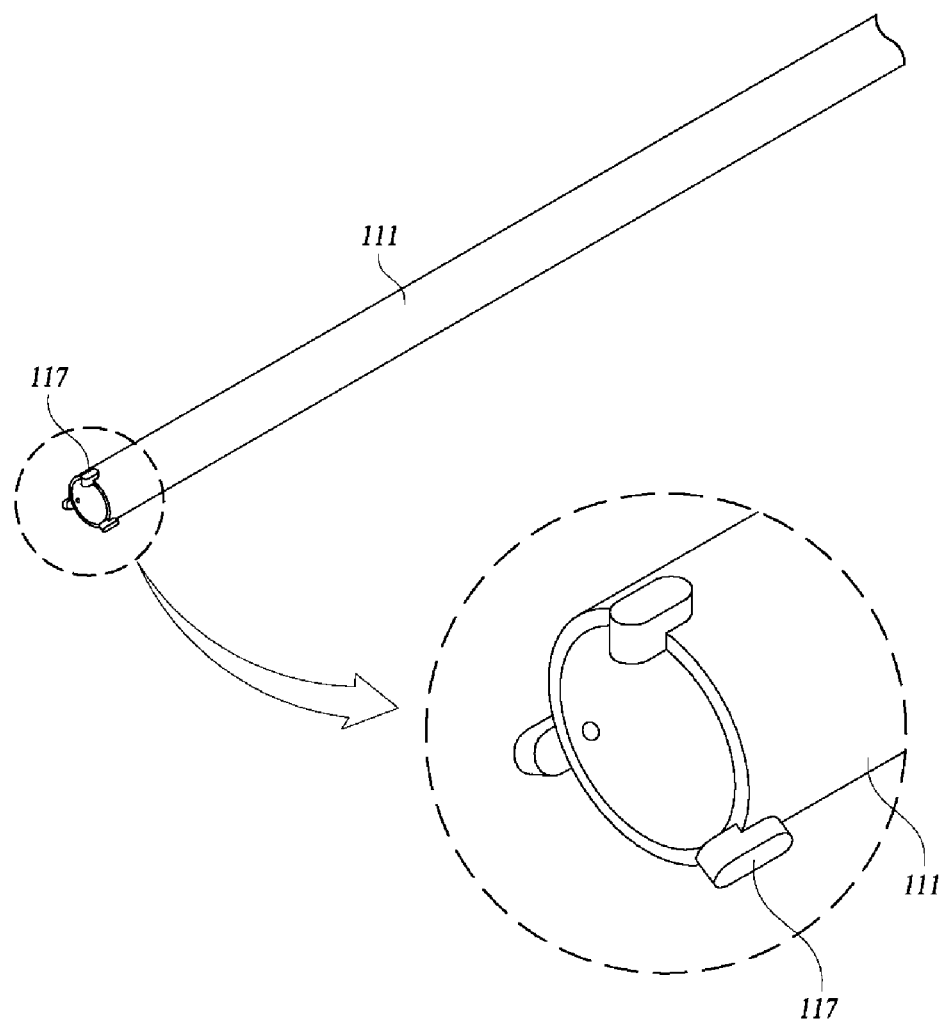
FIG. 23A is a perspective view illustrating a middle electrode shown in FIG. 19.
Figure 23B:
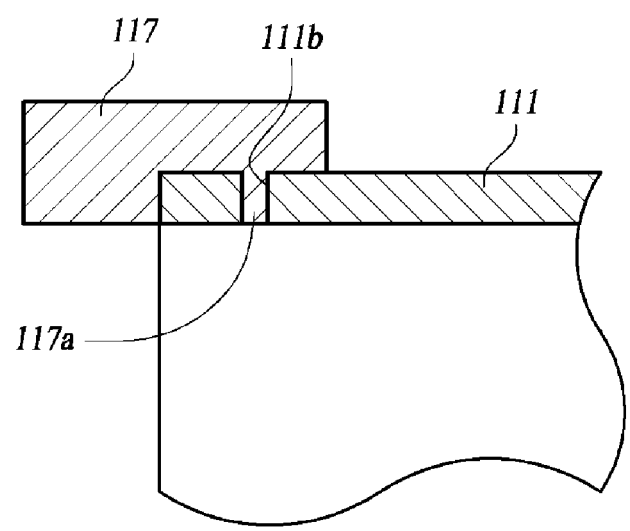
FIG. 23B is a cross-sectional view illustrating a main portion of FIG. 23A.
Figure 24:
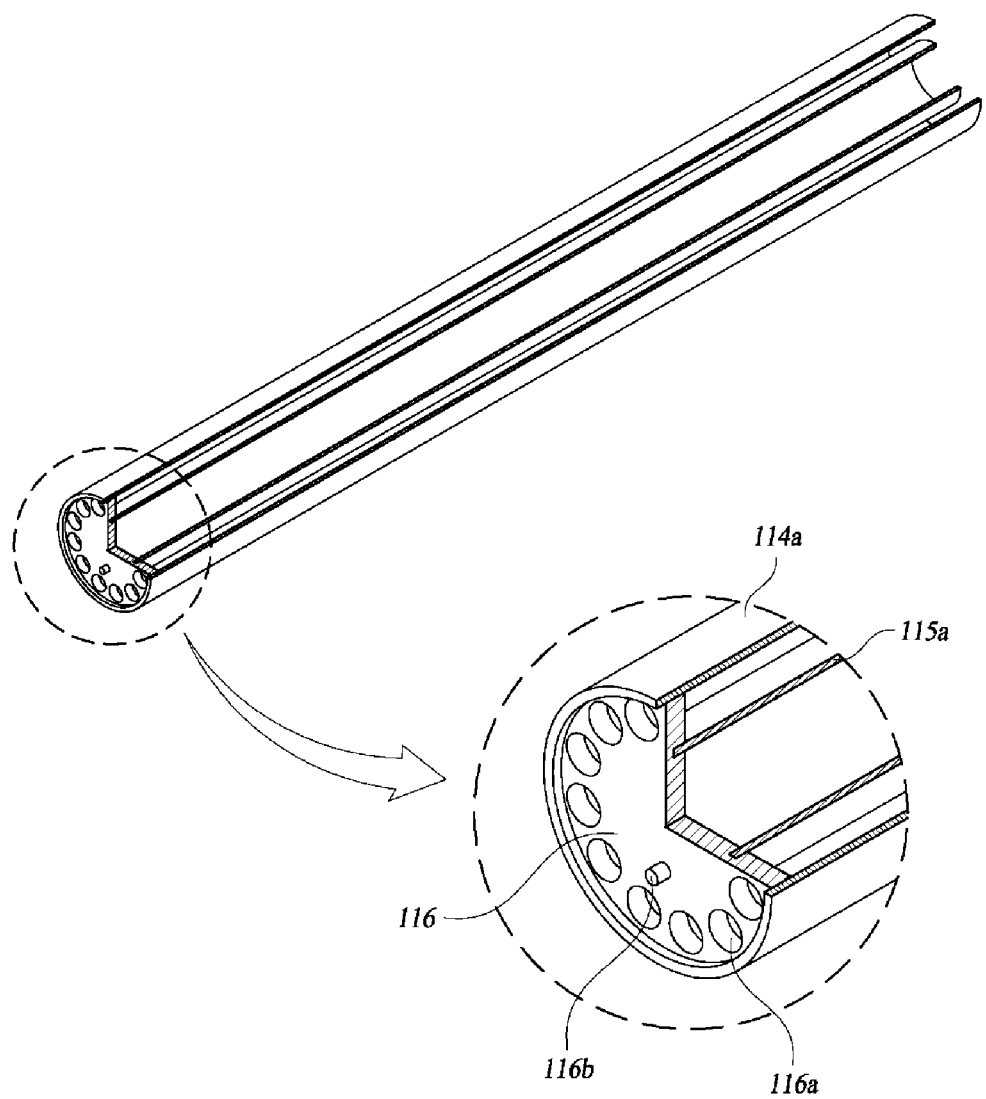
FIG. 24 is a diagram illustrating a connection portion in which an outer electrode and an inner electrode are connected to each other.
Figure 25:
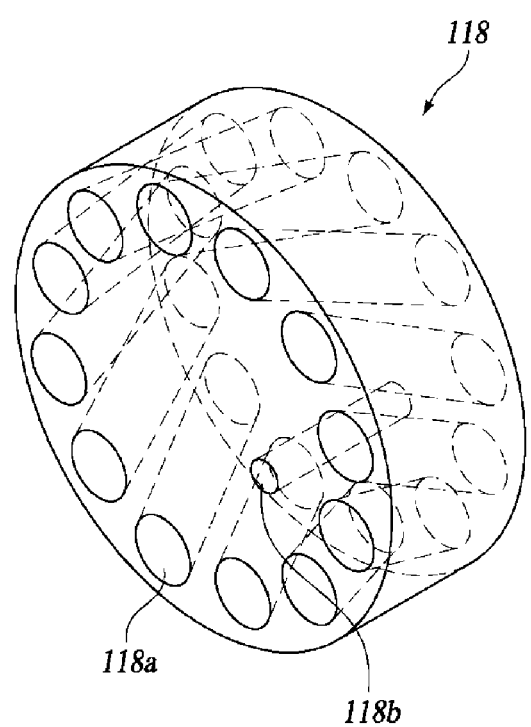
FIG. 25 is a diagram illustrating an outer insulating spacer shown in FIG. 19.

That is, the middle electrode 111 is a bipolar electrode having opposite polarities at opposite sides thereof. As shown in FIGS. 23A and 23B, each end of the middle electrode 111 is provided with insulating terminal spacers 117. Specifically, each end of the middle electrode 111 is provided with three insulating terminal spacers 117. The three insulating terminal spacers 117 may be arranged at an equal angular interval of 120° C. However, the number and interval of the insulating terminal spacers 117 are not limited thereto. More specifically, the insulating terminal spacers 117 may be provided to protrude outward from an end of the middle electrode 111 in a longitudinal direction and from the outside surface of the middle electrode 111. To this end, each insulating terminal spacer 117 is provided with a coupling pin 117a to be fitted into a coupling hole 111b provided at an end portion of the middle electrode 111. Due to the insulating terminal spacers 117, the middle electrode 111 can be spaced from the outer electrodes 114a and 114b and from the connection plates 116, by a predetermined distance. Therefore, the middle electrode 111 can be electrically insulated from the outer electrodes and the connection plates. The shape of the insulating terminal spacers 117 is not limited to the structure described above. That is, the insulating terminal spacers 117 can have any shape if they can space the middle electrode 111 from the outer electrodes 114a and 114b, and the connection plates 116, thereby electrically insulating the middle electrode 111 from the outer electrodes 114a and 114b and the connection plates 116. However, as to the structure of the insulating terminal spacers 117, there is a further requirement that it should not block sea water that is introduced into a channel formed between the electrodes through fluid passing holes formed in the connection plates 116.

The insulation unit includes an outer insulating spacer 112 installed outside the middle electrode 111, at a middle portion of the middle electrode 111 in a longitudinal direction thereof, and an inner insulating spacer 113 installed inside the middle portion at the middle portion. A further detailed description of the insulation will be given later.

Figure 26:
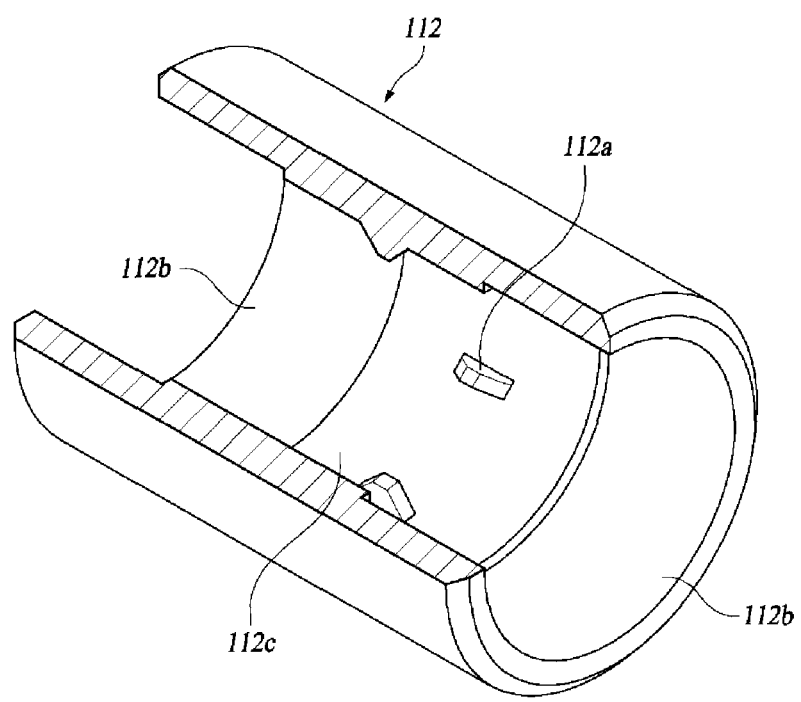
FIG. 26 is a diagram illustrating an inner insulating spacer shown in FIG. 19.
Figure 27:
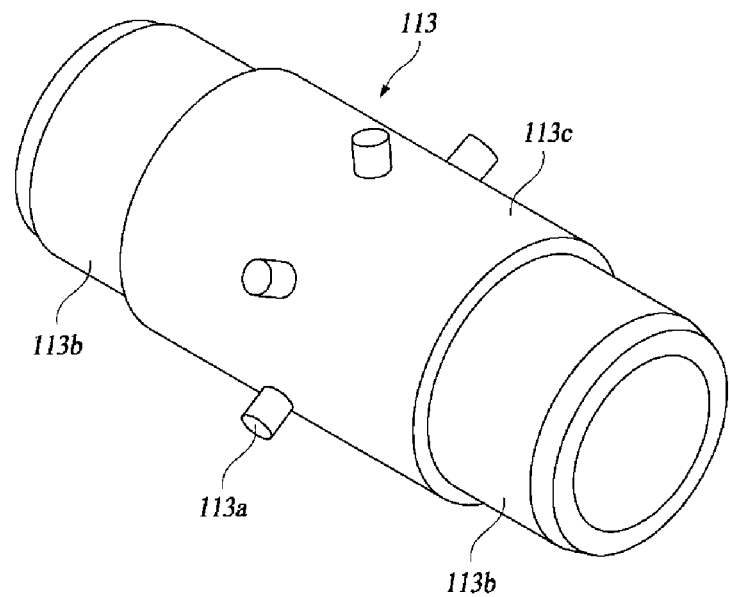
FIG. 27 is a diagram illustrating a spiral block shown in FIG. 19.

The outer electrodes 114a and 114b have a pipe shape. One outer electrode (114a) of the outer electrodes serves as a cathode and the other outer electrode (114b) serves as an anode. The outer insulating spacer 112 is provided between the outer electrode 114a and the outer electrode 114b to electrically insulate the outer electrodes 114a and 114b from each other and spaces the outer electrodes 114a and 114b from the middle electrode 111. As illustrated in FIG. 26, a middle portion of the inside surface of the outer insulating spacer 112 is provided with protrusions 112a which enable the inside surface of the outer insulating spacer 112 to be spaced from the outside surface of the middle electrode 111 by a predetermined distance. The protrusions 112a may be arranged at regular intervals in the circumferential direction of the outer insulating spacer 112 and are in surface contact with the outside surface of the middle electrode 111. Respective ends of the outer insulating spacer 112 are provided with outer electrode connection portions 112b into which end portions of the outer electrodes 114a and 114b are inserted, in which the outer electrode connection portions 112b have an inner diameter larger than an inner diameter of the middle portion of the outer insulating spacer 112. That is, the inside surface of the electrode connection portion 112b and the inside surface of the middle portion of the insulating outer spacer 112 form a step shape. Therefore, the outer electrodes 114a and 114b are supported on and insulated from each other by the outer insulating spacer 112.

As described above, adjacent ends (second ends) of the outer electrodes 114a and 114b are assembled with the outer insulating spacer 112, and the other ends (first ends) are respectively assembled with the connection pipes 120 or the inlet/outlet connection nipples 130.

In addition, the first ends of the outer electrodes 114a and 114b are connected to first ends of the inner electrodes 115a and 115b by the connection plates 116. The connection plates 116 are made of a metal. The first ends of the inner electrodes 115a and 115b and the first ends of the outer electrodes 114a and 114b are connected through a connection method such as welding that does not increase electrical resistance. Therefore, as to the inner electrodes 115a and 115b and the outer electrodes 114a and 114b connected by the connection plate 116, the outer electrode 114a and the inner electrode 115a, connected to each other, have the same polarity (i.e. both serving as a cathode) and the outer electrode 114b and the inner electrode 115b have the same polarity (i.e. both serving as an anode).

The inner insulating spacer 113 is provided between the inner electrodes 115a and 115b, so that the inner electrodes 115a and 115b are electrically insulated from each other by the inner insulating spacer 113. The inner insulating spacer 113 also spaces and electrically insulates the inner electrodes 115a and 115b from the middle electrode 111.

Herein, the inner insulating spacer 113 is installed at a middle portion inside the middle electrode 111 and is provided with a plurality of protrusions 113 on the outside surface thereof. The protrusions 113a protrude from the outside surface 113 of the inner insulating spacer 113 and are arranged at regular intervals in the circumferential direction. The protrusions 113 are in contact with the inside surface of the middle electrode 111. Respective ends of the inner insulating spacer 113 are provided with inner electrode connection portions 113b that have a smaller outer diameter than that of a middle portion of the inner insulating spacer 113 such that the outside surface of the inner electrode connection portion 113b and the outside surface of the middle portion of the inner insulating spacer 113 form a step shape. Therefore, the inner electrode connection portions 113b of the inner insulating spacer 113 can be respectively inserted into the adjacent ends of the inner electrodes 115a and 115b. The inner insulating spacer 113 supports the inner electrodes 115a and 115b while electrically insulating the inner electrodes 115a and 115b from each other, and also spaces and electrically insulates the inner electrodes 115a and 115b from the middle electrode 111.

The structures of the outer insulating spacer 112 and the inner insulating spacer 113 are not limited to those described above. The outer insulating spacer 112 and the inner insulating spacer 113 may have any structure that can meet requirements that the outer electrodes 114a and 114b can be supported in a state of being electrically insulated from each other, the inner electrodes 115a and 115b can be supported in a state of being electrically insulated from each other, and the outer electrodes and the inner electrodes can be spaced and electrically insulated from the middle electrode 111 by a predetermined distance. In this case, the protrusions 112a of the outer insulating spacer 112 and the protrusions 113a of the inner insulating spacer 113, which are provided to space and electrically insulate the outer electrodes and the inner electrodes from the middle electrode 111, are preferably configured not to impede the flow of sea water which flows along a channel provided between the outer electrode and the middle electrode and a channel provided between the inner electrode and the middle electrode.

According to the structure described above, power is oppositely supplied to the bipolar electrode, i.e. the pipe-type middle electrode 11, which is disposed between and spaced from the outer electrodes 114a and 114b and the inner electrodes 115a and 115b, with respect to the outer electrodes 114a and 114b and the inner electrodes 115a and 115b. Accordingly, an electrolytic reaction occurs in a state in which a fluid flows along the outside surface and the inside surface of the middle electrode 111. Since the electrolytic reaction occurs while the fluid is flowing along the outside surface and the inside surface of the middle electrode 111, the pipe-type electrolysis cell of the present invention exhibits electrolysis performance that is twice or more than that of conventional pipe-type electrolysis cells. That is, with the same volume as a conventional pipe-type electrolysis cell, the pipe-type electrolysis cell of the invention can obtain two times higher electrolysis efficiency than the conventional pipe-type electrolysis cell. Since those skilled in the art can easily understand the detailed structure and operation of the pipe-type electrolysis cell, there will be no further description thereof.

In addition, the connection plate 116 is provided with a plurality of fluid passing holes 116a that are equal in size and are arranged at regular intervals in a circumferential direction of the connection plate 116 such that the fluid can be introduced into a gap between the inner electrodes 115a and 115b and the outer electrodes 114a and 114b. In addition, one or more positioning guide pins 116b are formed to protrude from the outside surface of the connection plate 116. The positioning guide pins 116b are configured to enable a combined structure of the electrodes to be precisely and accurately aligned with the spiral block 118 when the combined structure of the electrodes is combined with the spiral block.

In addition, the connection plate 116 may be made of a plurality of plates arranged in multiple stages. In this case, the plates are stacked such that the fluid passing holes provided to each plate are misaligned. That is, a fluid path extending through the fluid passing holes of the plates may form a spiral shape. Alternatively, each fluid passing hole 116a may extend in a spiral form in the connection plate 116, thereby guiding the fluid along a spiral flow path.

The spiral block 118 is connected to the outside surface of the connection plate 116. The spiral block 118 is provided with a plurality of spiral guide holes 118a that are arranged at intervals in a circumferential direction of the spiral block 118. Since the fluid spirally flows while passing through the spiral guide holes 118a, velocity distribution of the fluid can be uniformized. In addition, the spiral block 118 is provided with a positioning hole 118b that is used to position the spiral block 118 such that the guide holes 118a of the spiral block 118 can be precisely and accurately aligned with the fluid passing holes 116a of the connection plate 116 when the spiral block 118 is connected to the connection plate 116. When the positioning guide pin 116b of the connection plate 116 is inserted into the positioning hole 118b, the fluid passing holes 116a are automatically aligned with the guides hole 118a. Therefore, the fluid can flow without flow resistance. The spiral block 118 is assembled with the connection pipe 120 or the inlet/outlet connection nipple 130.

In addition, as to the middle electrode 111, a half of each of the outside surface and the inside surface in terms of the longitudinal direction is coated with an anode material. That is, both of the outside surface and the inside surface of the middle electrode 111 can be used for an electrolytic reaction unlike conventional arts. Therefore, electrolysis capacity is doubled.

In addition, among the terminal electrodes, the outer electrode 114a serving as the cathode and the inner electrode 115a serving as the cathode are made of stainless steel or nickel alloys. The outer electrode 114a and the inner electrode 115a serving as the cathode are connected to the connection plate 116 through a connection method such as welding that does not increase electric resistance. In addition, one or more surfaces of the electrodes, which do not participate in an electrolytic reaction while the sea water flows, for example, i.e. the inside surface of the inner electrode 115a or the outside surface of the outer electrode 114a, are preferably coated with a metal having a high electric conductivity, which uniformly distributes current intensity over the entire length of the electrode during the electrolytic reaction. For this reason, uniformity and efficiency of the electrolytic reaction can be improved compared with conventional multi-stage electrolytic cells, and heat generated during the electrolytic reaction can be controlled.

In addition, among the terminal electrodes, the outer electrode 114b and the inner electrode 115b serving as the anode are made of titanium. The inside surface of the outer electrode 114a and the outside surface of the inner electrode 115b are coated with a platinum oxide to form insoluble electrodes. Furthermore, these electrodes are plated and welded in the same manner as the electrodes serving as the cathode described above, thereby maintaining the electrical conductivity.

A plurality of pipe-type electrolysis cells 110 having the structure described above are arranged in series, and adjacent ends thereof are connected to each other by the connection pipe 120 so that a fluid can flow from one cell to another. The connection pipe 120 has a U shape. The outermost pipe-type electrolysis cells 110 of the electrolysis unit module 100 are connected to power cables 400.

In addition, among the plurality of pipe-type electrolysis cells 110, the outermost electrolysis cells 110 are connected to the inlet/outlet connection nipples 130. That is, outer ends of both of the outermost pipe-type electrolysis cell 110 are connected to the connection pipes 120 or the connection nipples 130. Alternatively, the outer end of one of the outermost pipe-type electrolysis cells 110 may be connected to the connection pipe 120 and the outer end of the other of the outermost pipe-type electrolysis cells 110 may be connected to the connection nipple 130. The connection pipe 120 and the connection nipple 130 are elements through which a fluid can be introduced into the pipe-type electrolysis cell 110 or fluid in the pipe-type electrode cell 110 can be discharged outside. The connection pipe 120 and the connection nipple 130 are assembled with ends of the spiral blocks 118. The connection nipple 130 may extend to the outside of the molding case 200 through a nipple passing hole 230 (see FIGS. 12A and 12B) formed in the molding case 200.

Figure 28A:
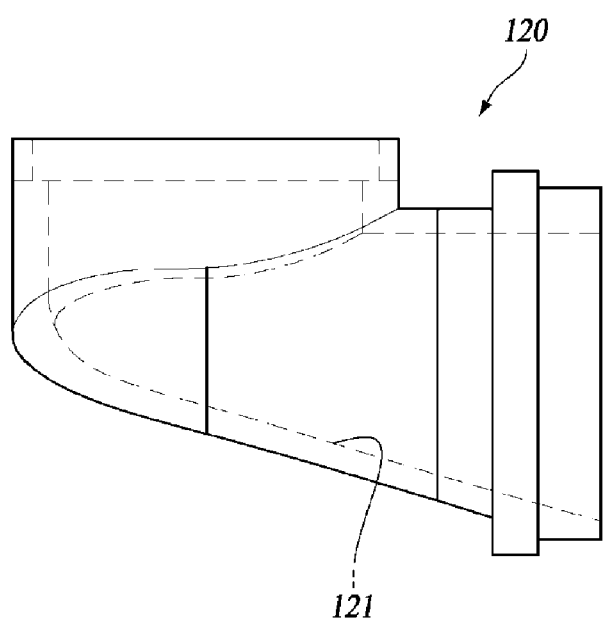
FIG. 28A is a diagram illustrating an example of a connection pipe.
Figure 28B:
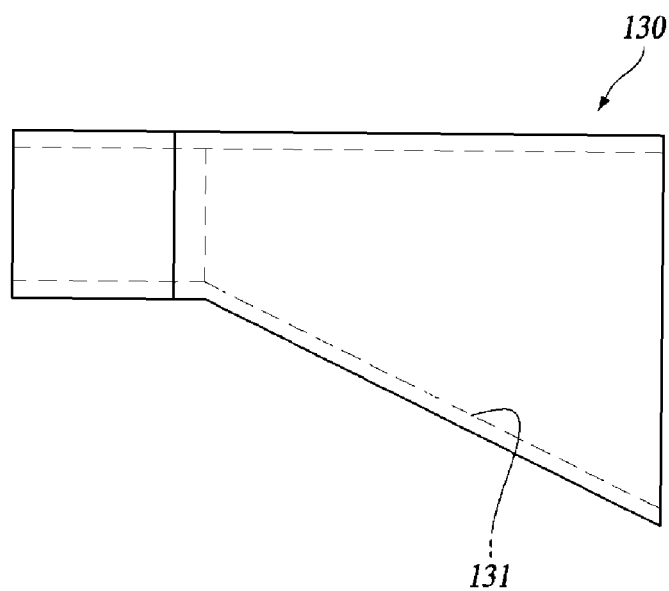
FIG. 28B is a diagram illustrating an example of a connection nipple.

In at least either one of the connection pipe 120 and the connection nipple 130, an internal fluid channel, i.e. fluid passage channel, has a tapered form so that movement of fluid and separation of hydrogen are facilitated. That is, the connection pipe 120 and the connection nipple 130 have bottom surfaces 121 and 131 that are sloped upward toward the outer ends thereof as shown in FIGS. 28A and 28B.

The electrolysis unit module 100 is configured such that a plurality of pipe-type electrolysis cells 110 is arranged in series and assembled as shown in FIG. 12, in which adjacent pipe-type electrolysis cells 110 are electrically connected to each other by a ring-shaped connection terminal 140 in the assembled state. In addition, terminals 150 are connected to connectors 140 connected to the outermost pipe-type electrolysis cells 110, and the power cables 400 are connected to the terminal 150 by coupling members 160 (see FIG. 18) such as bolts.

The molding case 200 has a rectangular frame shape. The assembled electrolysis unit module 100 is molded in a state of being disposed inside the molding case 200. The molding case 200 consists of a pair of long bars 210 and a pair of short bars 220 that are connected to respective ends of the long bars 210. Inner surfaces of the long bars 210 are provided with guide member assembling holes 240 into which ends of the cell guide members 300 are inserted. The short bars 220 are provided with cable passing holes 250 through which the power cables 400 pass and the nipple passing holes 230 through which the inlet/outlet connection nipples 130 pass.

There are multiple cell guide members 300. Respective ends of each cell guide member 300 are inserted into the guide member assembling holes 240 formed in the long bars 210 such that the cell guide members 300 are disposed inside the molding case 200, thereby supporting the assembled electrolysis unit module 100. To this end, the cell guide members 300 are installed to extend across the molding case 200. The cell guide members 300 are made of a flexible insulating material or have a flexible structure. The cell guide member 300 has a structure in which arc-shaped concave portions 310 are arranged in a row, thereby conforming to the outer surfaces of the pipe-type electrolysis cells 110 connected in series with each other. Thus, the cell guide member 300 can be in tight contact with and can support the outer surfaces of the pipe-type electrolysis cells 110.

Figure 12A:
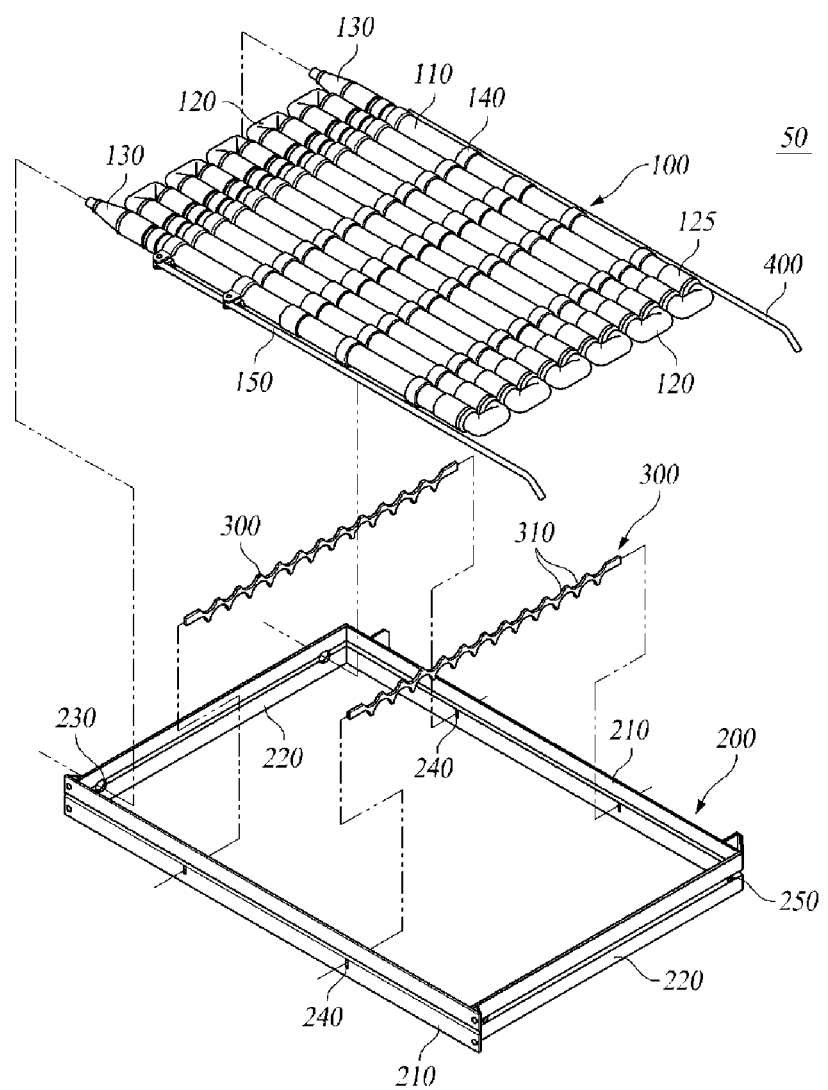
FIG. 12A is an exploded perspective view showing an assembling process of an electrolysis module according to one embodiment of the present invention.
Figure 12B:
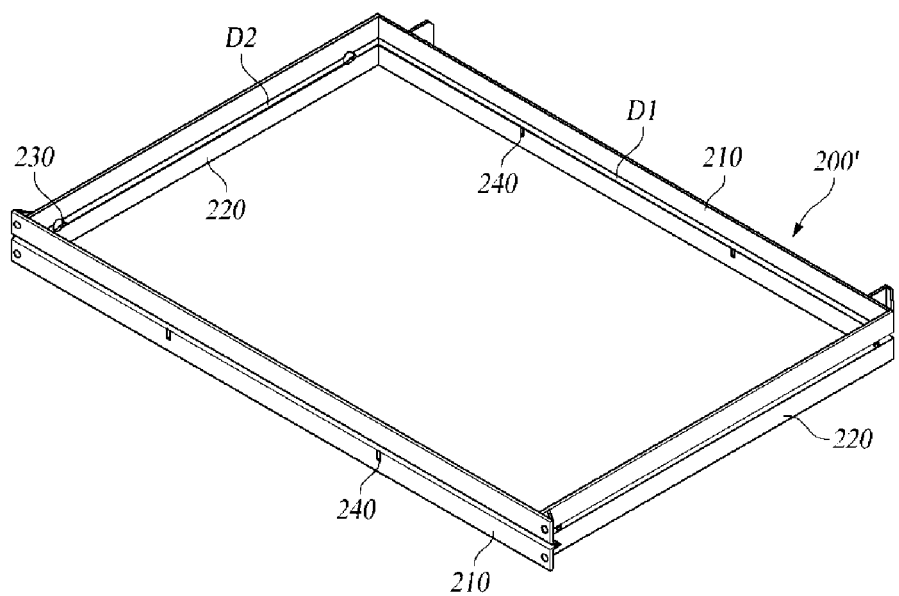
FIG. 12B is a perspective view illustrating another example of a molding case shown in FIG. 12A.
Figure 12C:
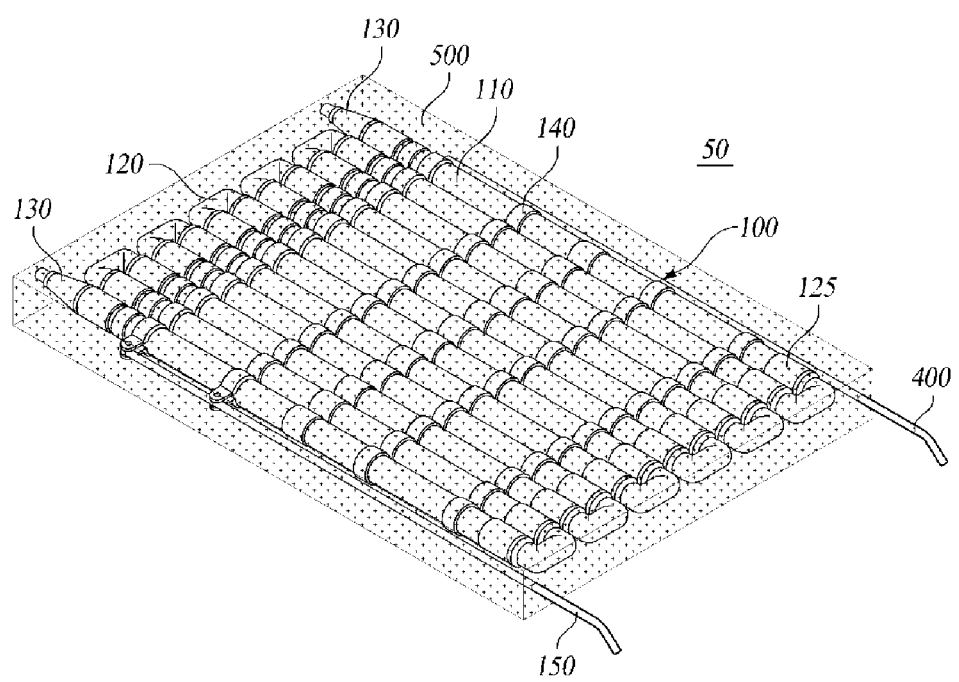
FIG. 12C is a perspective view of an electrolysis module according to another embodiment of the present invention.
Figure 13:
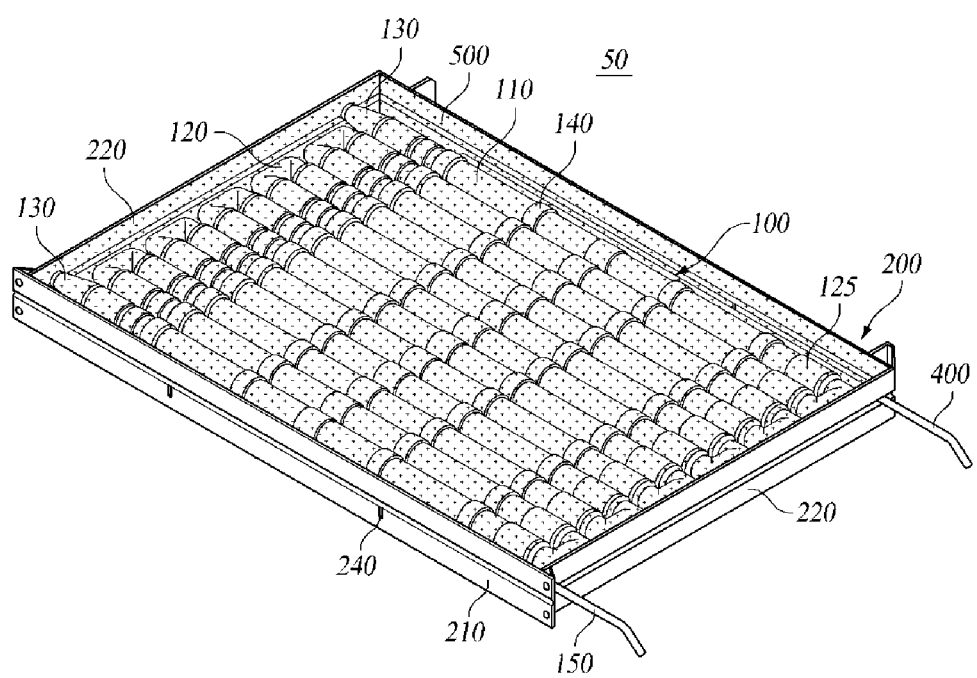
FIG. 13 is a perspective view of a partially assembled electrolysis module according to one embodiment of the present invention.

In this case, as shown in FIG. 12B, a molding case 200' according to another example may be configured such that a resin filling portion (refer to reference characteristics D1 and D2) is bent to increase bonding force to a resin or an inner surface of the molding case 200' is imparted with surface roughness.

In addition, the molding case 200 is filled with a resin and the resin is cured. Next, the molding case 200 is removed (see FIG. 12C). The filled and cured resin may function as the molding case.

In a state in which the cell guide member 300 is assembled with the molding case 200, the assembled electrolysis unit module 100 is placed on the cell guide member 300. In this way, the electrolysis unit module 100 is provided inside the molding case 200. After the assembled electrolysis unit module 100 is placed inside the molding case 200, the power cable 400 is connected to the electrolysis unit module 100, and then a resin is introduced into a space in the molding case 200 and supplied to surround the entire surface of the electrolysis unit module 100, thereby forming a resin layer 400. Here, the resin layer 400 may be preferably formed of epoxy resin. Alternatively, the resin layer 400 may be preferably made of a fire retardant resin. The state of the molded electrolysis unit module 100 can be checked from outside.

As described above, in a state in which the electrolysis unit module 100 is assembled and then placed inside the molding case 200, a resin is introduced into the molding case 200, thereby forming a molded electrolysis module 50. Therefore, it is possible to substantially prevent leakage of water and hydrogen from the electrolysis cells 110 and to reduce the number of parts to be assembled due to the molding process.

Figure 14:
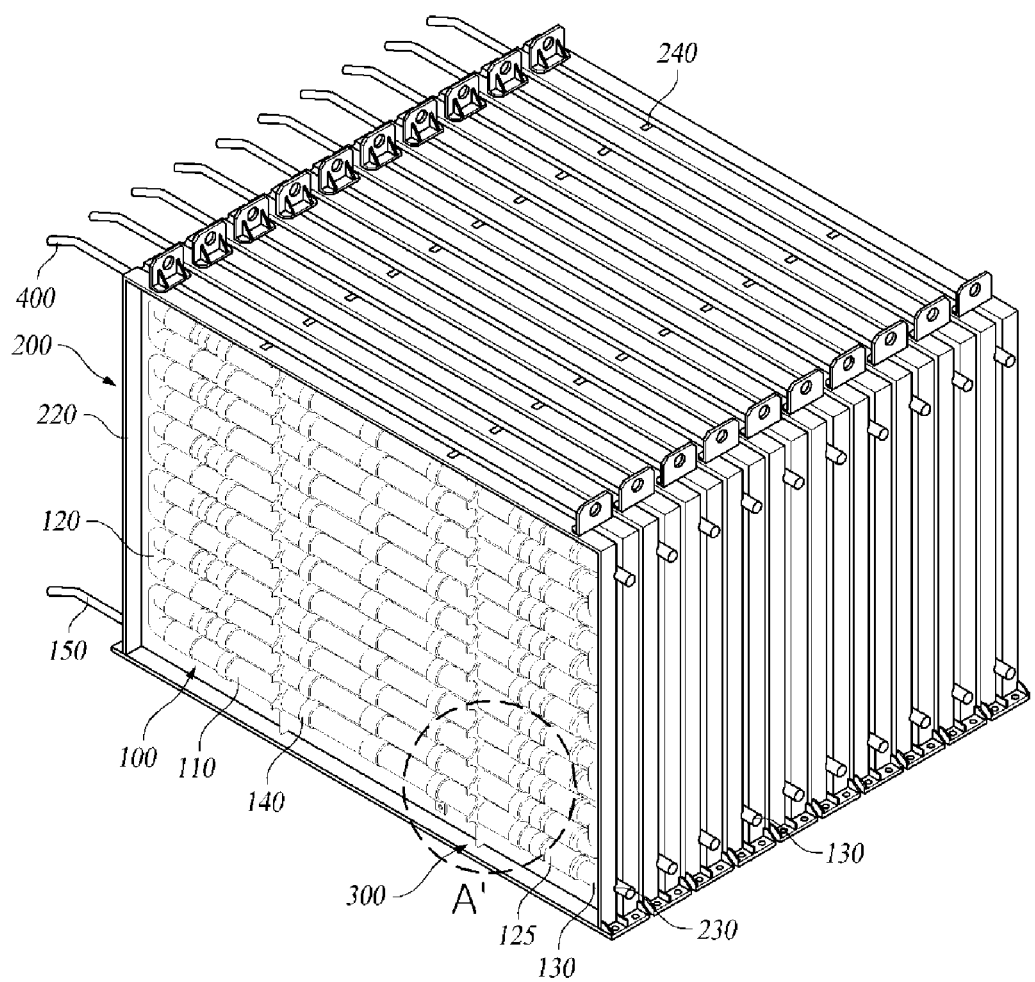
FIG. 14 is a perspective view illustrating a state in which the electrolysis modules according to one embodiment of the present invention are connected in parallel with each other to obtain a large electrolysis capacity.
Figure 15:
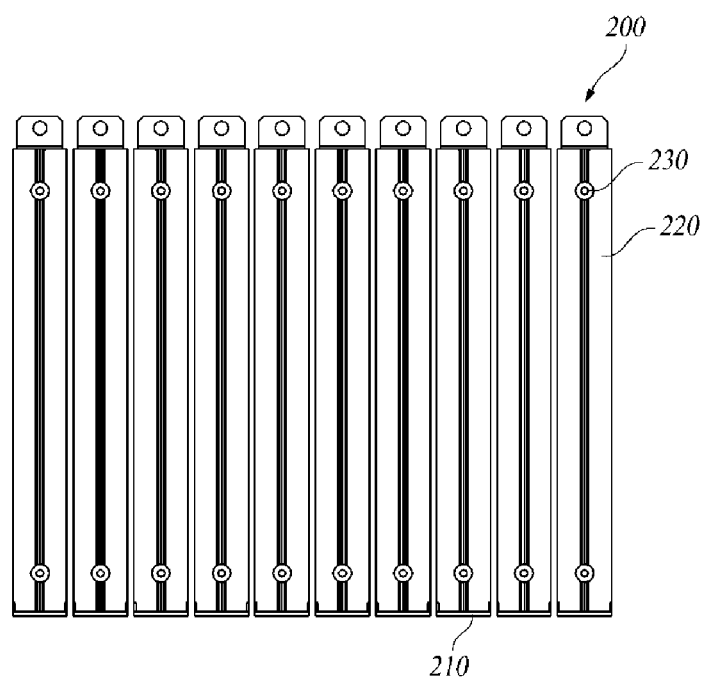
FIG. 15 is a side view of the electrolysis module of FIG. 14.
Figure 16:
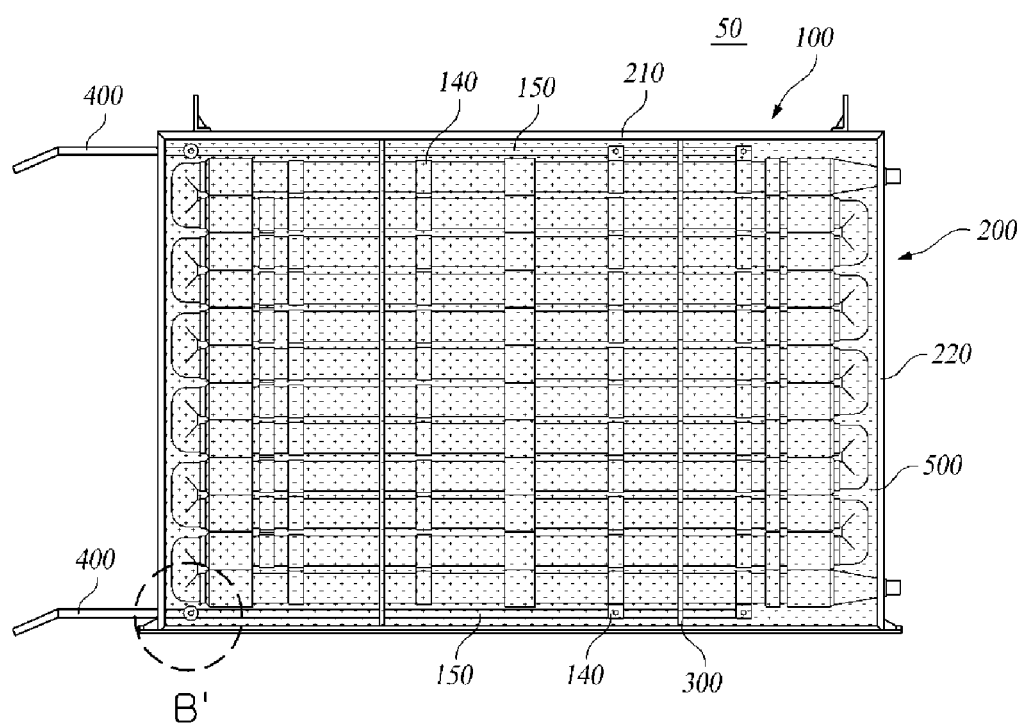
FIG. 16 is a plan view of the electrolysis module of FIG. 13.
Figure 17:
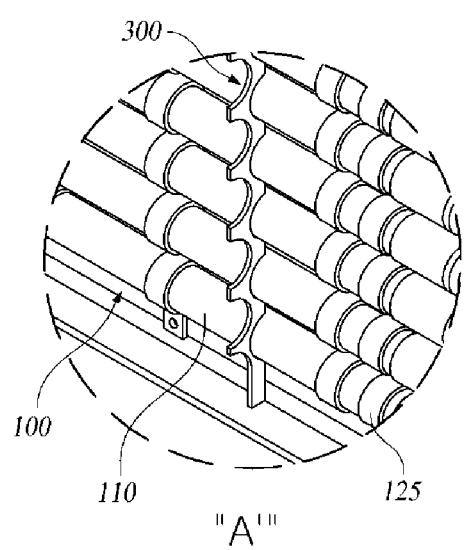
FIG. 17 is an expanded view of a portion A' of FIG. 14 의 A'.
Figure 18:
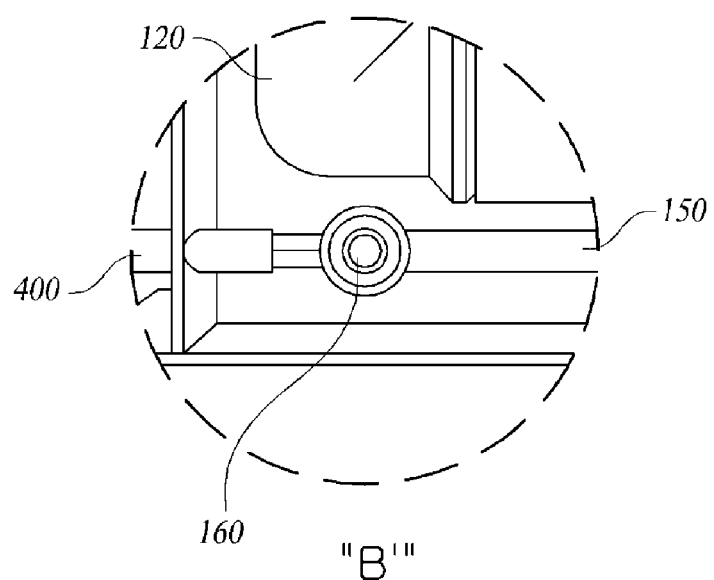
FIG. 18 is an expanded view of a portion B' of FIG. 16.
Figure 19:
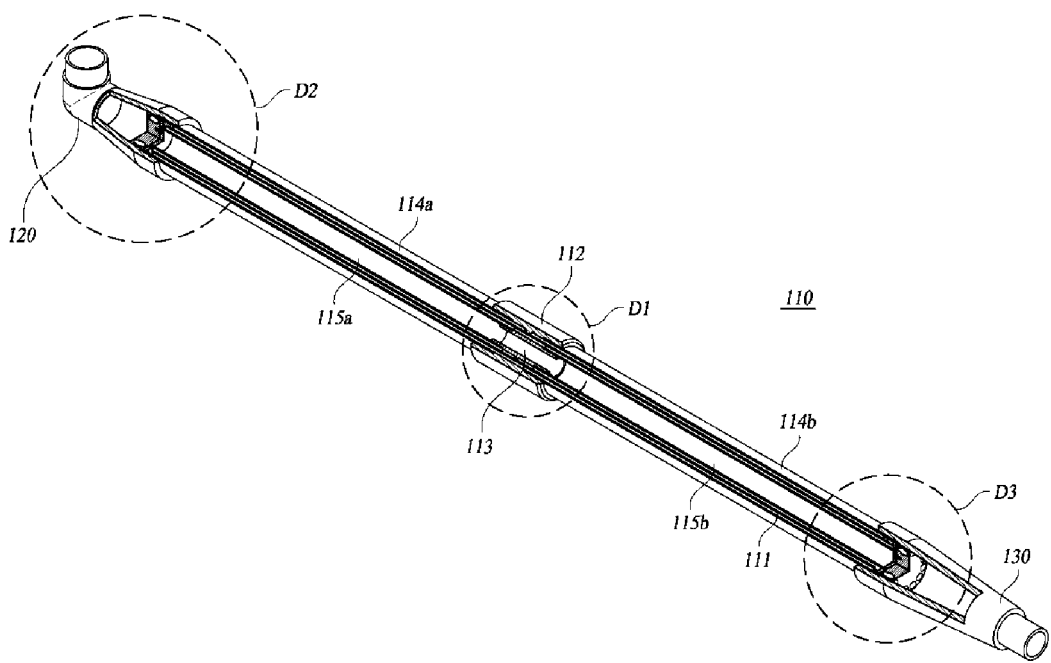
FIG. 19 is a perspective view of the pipe-type electrolysis cell shown in FIG. 12.
Figure 20:
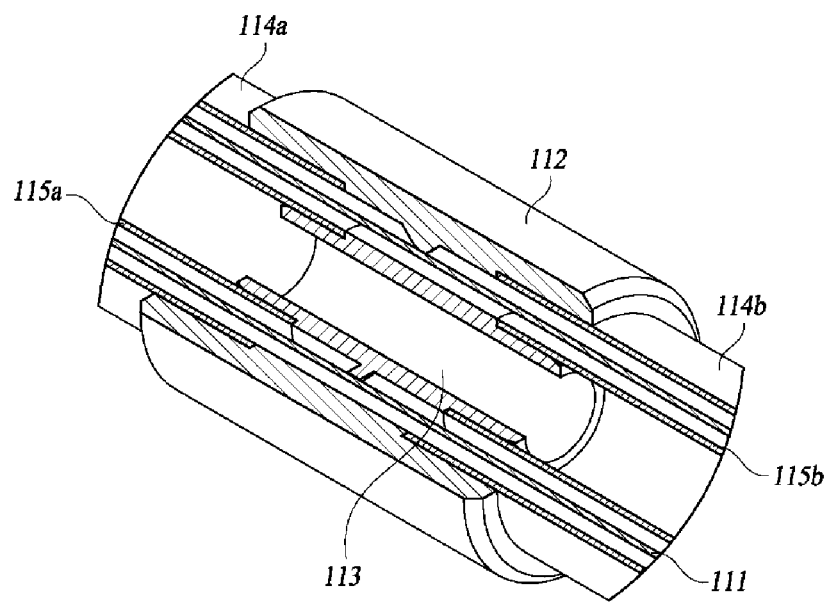
FIG. 20 is an expanded view of a portion D1 of FIG. 19.
Figure 21:
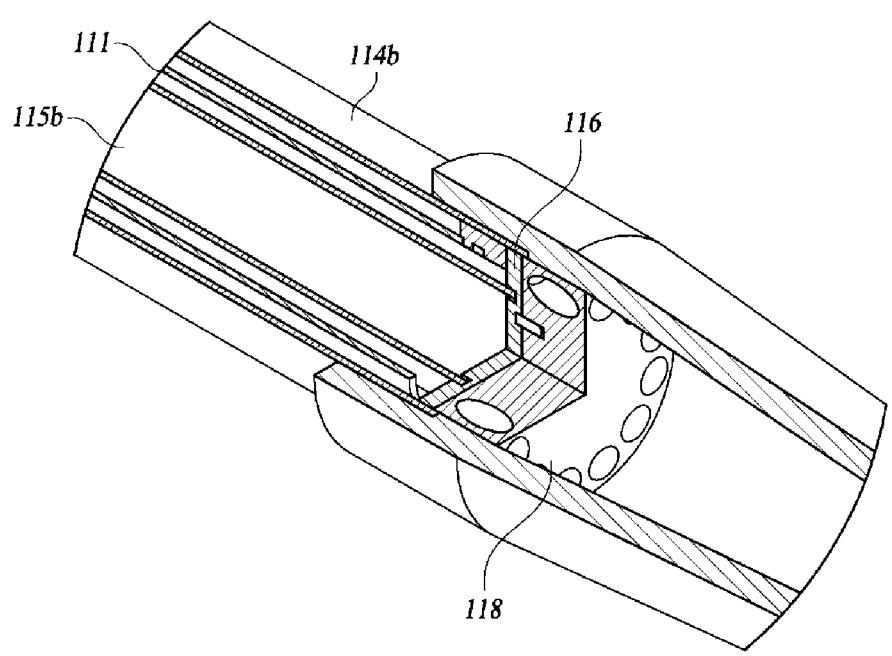
FIG. 21 is an expanded view D2 of FIG. 19.
Figure 22:
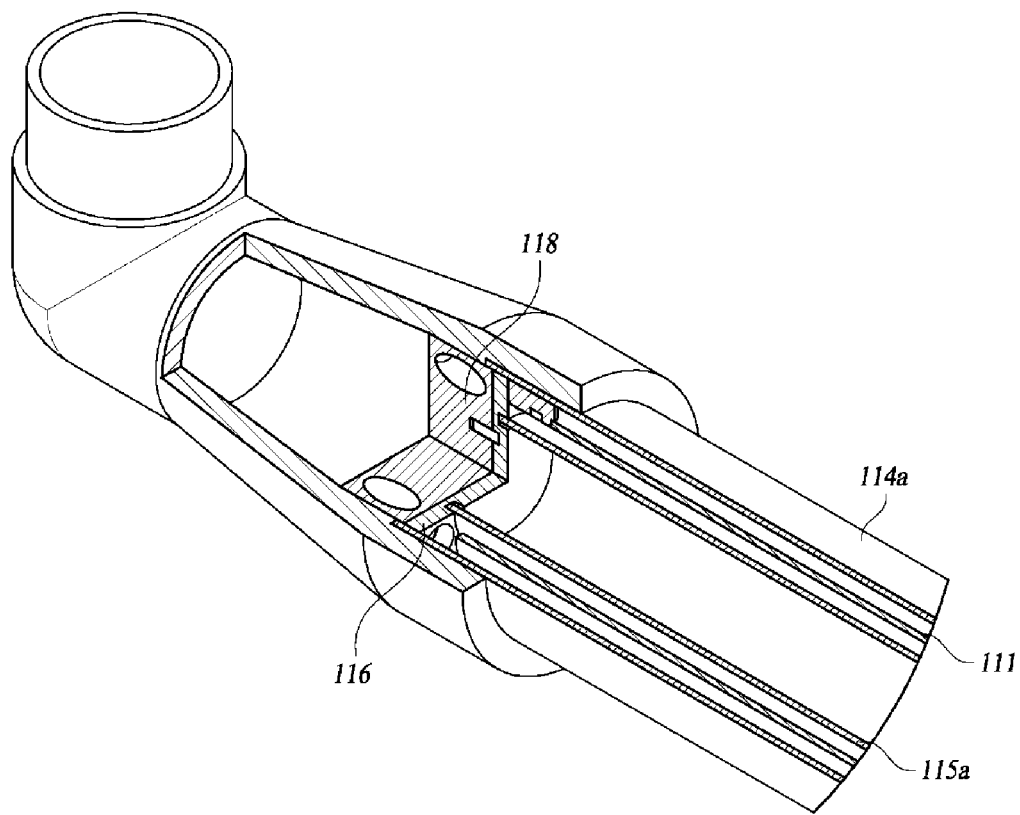
FIG. 22 is an expanded view D3 of FIG. 19.

In addition, as illustrated in FIGS. 14 and 15, the electrolysis capacity of the molded electrolysis module 50 can be changed and adjusted by compactly connecting the electrolysis cells. In addition, since the molded electrolysis module 50 is in a safe state in which water and hydrogen leakage is prevented and workers are protected from electric shock, it is unnecessary to encase an electrolysis module as is required in conventional arts. Therefore, it is not necessary to use a water sensor for sensing water leakage, nor a hydrogen sensor for sensing hydrogen leakage. For this reason, the manufacturing cost can be reduced.

In addition, since a transparent resin is used for the molding treatment, the state of the electrolysis module can be easily checked and inspected, and thus maintenance of the electrolysis module becomes easy.

As described above, the pipe-type electrolysis cell 110 according to the embodiment of the invention is structured such that the pipe-type bipolar electrode (i.e. middle electrode) is arranged between the terminal electrodes consisting of the outer electrode and the inner electrode, thereby enabling the electrolytic reaction to occur on both the inside surface and the outside surface of the bipolar electrode. In this way, an amount of electrolytic reactions that was performed by two conventional electrolysis modules can be performed by one electrolysis module. That is, according to the present invention, the electrolysis module can obtain an electrolysis performance equal to that of a conventional electrolysis module even while being only half the size. In this case, the amount of electrode material is reduced to about 65%, and the amount of epoxy molding material and the amount of frames are also reduced by about 50%. For this reason, it is possible to reduce the size and the manufacturing cost while maintaining the capacity. Therefore, the electrolysis module of the invention is considerably more cost effective. In addition, the electrolysis module of the invention can be installed in old ships as well as new ships because it requires a reduced installation space.

Although, a preferred embodiment has been described and illustrated to explain the principle of the present invention, the present invention should not be construed to be limited only to the structures and operations described above, but those skilled in the art will appreciate that various modifications, additions and substitutions are possible, without departing from the scope and spirit of the invention as disclosed in the accompanying claims.

The invention claimed is:

1. An electrolysis module comprising:
   an electrolysis unit module including a plurality of pipe-type electrolysis cells connected in series with each other;
   a molding case surrounding and protecting the electrolysis unit module;
   a cell guide member installed inside the molding case and supporting the electrolysis unit module;
   a power cable having a first end connected to the electrolysis unit module and a second end extending to an outside through the molding case; and
   a resin layer filled in the molding case to cover an outer surface of the electrolysis unit module disposed in the molding case,
   wherein the pipe-type electrolysis cell comprises:
      a pair of terminal electrodes including a pipe-type outer electrode and a pipe-type inner electrode that are connected to each other at first ends thereof and separated from each other at second ends thereof; and
      a pipe-type bipolar electrode disposed coaxially between the outer electrode and the inner electrode and electrically insulated from the terminal electrodes,
   wherein a portion of the bipolar electrode includes an anode material coating on both an inner surface and an outer surface thereof.

2. A electrolysis module comprising:
- an electrolysis unit module including a plurality of pipe-type electrolysis cells connected in series with each other;
- a power cable having a first end connected to the electrolysis unit module;
- a cell guide member extending across the electrolysis module to maintain a series-connected state of the electrolysis unit module; and
- a resin layer formed by introducing a resin into a molding case to cover an outer surface of the electrolysis unit module disposed in the molding case, in a state in which the electrolysis unit module is assembled with the power cable and the cell guide member and in which the molding case is disposed to surround a periphery surface of the electrolysis unit module, and then by removing the molding case after the resin is cured,
- wherein the pipe-type electrolysis cell comprises:
  - a pair of terminal electrodes including a pipe-type outer electrode and a pipe-type inner electrode that are connected to each other at first ends thereof and separated from each other at second ends thereof; and
  - a pipe-type bipolar electrode installed between the outer electrode and the inner electrode and electrically insulated from the terminal electrodes,
  - wherein a portion of the bipolar electrode includes an anode material coating on both an inner surface and an outer surface thereof.

3. The electrolysis module according to claim 1, wherein the pipe-type electrolysis cell further comprises: an insulation unit supporting and connecting the separated ends of the terminal electrodes to each other; a spiral block combined with the connected ends of the terminal electrodes and provided with a spiral guide hole through which a fluid passes.

4. The electrolysis module according to claim 1, wherein the terminal electrode includes a connection plate connecting and supporting the ends of the inner electrode and the outer electrode, the connection plate being provided with a fluid passing hole communicating with a channel formed between the inner electrode and the outer electrode and guiding a fluid to the channel.

5. The electrolysis module according to claim 4, further comprising a terminal insulating spacer installed at each end of the bipolar electrode and spacing and electrically insulating the bipolar electrode from the connection plate, the inner electrode, and the outer electrode.

6. The electrolysis module according to claim 1, wherein at least any one of an outer surface of the outer electrode and an inner surface of the inner electrode, which are surfaces that are not involved in an electrolytic reaction, is plated with a metal having a high electrical conductivity.

7. The electrolysis module according to claim 4, wherein the connection plate having the fluid passing hole is connected to the outer electrode through welding.

8. The electrolysis module according to claim 4, wherein fluid passing holes formed in the connection plate are through holes aligned with spiral guide holes formed in the spiral block.

9. The electrolysis module according to claim 4, wherein the unit modules are connected in parallel with each other to increase a capacity.

10. The electrolysis module according to claim 2, wherein the pipe-type electrolysis cell further comprises: an insulation unit supporting and connecting the separated ends of the terminal electrodes to each other; a spiral block combined with the connected ends of the terminal electrodes and provided with a spiral guide hole through which a fluid passes.

11. The electrolysis module according to claim 2, wherein the terminal electrode includes a connection plate connecting and supporting the ends of the inner electrode and the outer electrode, the connection plate being provided with a fluid passing hole communicating with a channel formed between the inner electrode and the outer electrode and guiding a fluid to the channel.

12. The electrolysis module according to claim 11, further comprising a terminal insulating spacer installed at each end of the bipolar electrode and spacing and electrically insulating the bipolar electrode from the connection plate, the inner electrode, and the outer electrode.

13. The electrolysis module according to claim 2, wherein at least any one of an outer surface of the outer electrode and an inner surface of the inner electrode, which are surfaces that are not involved in an electrolytic reaction, is plated with a metal having a high electrical conductivity.

14. The electrolysis module according to claim 11, wherein the connection plate having the fluid passing hole is connected to the outer electrode through welding.

15. The electrolysis module according to claim 11, wherein fluid passing holes formed in the connection plate are through holes aligned with spiral guide holes formed in the spiral block.

16. The electrolysis module according to claim 11, wherein the unit modules are connected in parallel with each other to increase a capacity.

17. An electrolysis module comprising:
- an electrolysis unit module including a plurality of pipe-type electrolysis cells connected in series with each other;
- a molding case surrounding and protecting the electrolysis unit module;
- a cell guide member installed inside the molding case and supporting the electrolysis unit module;
- a power cable having a first end connected to the electrolysis unit module and a second end extending to an outside through the molding case; and
- a resin layer filled in the molding case to cover an outer surface of the electrolysis unit module disposed in the molding case,
- wherein the pipe-type electrolysis cell comprises:
  - a pair of terminal electrodes including a pipe-type outer electrode and a pipe-type inner electrode that are connected to each other at first ends thereof and separated from each other at second ends thereof; and
  - a pipe-type bipolar electrode disposed coaxially between the outer electrode and the inner electrode and electrically insulated from the terminal electrodes,
  - wherein an anode material is coated on an inner surface of the outer electrode, an outer surface of the inner electrode, an inner surface of the bipolar electrode, and an outer surface of the bipolar electrode.

* * * * *